United States Patent [19]

Coetsier et al.

[11] Patent Number: 4,922,443
[45] Date of Patent: May 1, 1990

[54] DATA ACQUISITION AND PROCESSING EQUIPMENT FOR TESTING AUTOMOTIVE VEHICLES

[75] Inventors: Paul Coetsier; Denis Douine, both of Lagny, France

[73] Assignee: Etablissements M. Muller & Cie., Chelles, France

[21] Appl. No.: 224,399

[22] Filed: Jul. 26, 1988

[30] Foreign Application Priority Data

Aug. 7, 1987 [FR] France .................................. 8711265

[51] Int. Cl.$^5$ ...................... G06F 15/74; G01M 17/00
[52] U.S. Cl. ................................ 364/551.01; 73/117.2; 364/431.01
[58] Field of Search ....................... 364/431.03, 431.01, 364/431.11, 550, 551.01; 73/117.2, 117.3, 117, 116, 119 R, 122, 118.1; 370/10; 371/70

[56] References Cited

U.S. PATENT DOCUMENTS

| | | | |
|---|---|---|---|
| 3,889,273 | 6/1975 | Deiss et al. | 73/117 |
| 4,113,980 | 9/1978 | Bell | 73/117.2 |
| 4,121,452 | 10/1978 | Wakabayashi et al. | 73/117.3 |
| 4,375,672 | 3/1983 | Kato et al. | 73/117.2 |
| 4,425,647 | 1/1984 | Collins et al. | 371/70 |
| 4,656,586 | 4/1987 | Ochiai et al. | 73/117.3 |
| 4,757,463 | 7/1988 | Ballou et al. | 73/117.2 |
| 4,831,540 | 5/1989 | Hesser | 364/468 |

FOREIGN PATENT DOCUMENTS

| | | |
|---|---|---|
| 3313481 | 10/1984 | Fed. Rep. of Germany . |
| 3515698 | 11/1986 | Fed. Rep. of Germany ...... 364/468 |
| 57-22531 | 2/1982 | Japan . |
| 57-175241 | 10/1982 | Japan . |

OTHER PUBLICATIONS

"Das Hierarchische, Dezentral Strukturierte ProzeBleitsystem Im Versuchszentrum Des Volkswagenwerks", *Regelungstechnische Praxis*, vol. 16, No. 12, 1974, by V. Lons et al., pp. 315–322.

"Das Automatisierte PrufstrasBensystem Des TUV Rheinland", *ATZ Automobiltechnische Zeitschrift*, vol. 79, No. 9, 1977, by H. Hirschberger, pp. 401, 402, 405 and 406.

*Primary Examiner*—Felix D. Gruber
*Attorney, Agent, or Firm*—Young & Thompson

[57] ABSTRACT

Data acquisition and processing equipment permits simultaneous testing of a plurality of automotive vehicles located at different test stations of a technical test center. The equipment comprises remote control boxes each having an electronic identity, a display console enabling operators to assign each control box to one vehicle, a CRT screen for displaying test data as well as a menu of test operations, remote control receivers for the signal transmitted by the control boxes, a computerized central unit connected to the display console, to the different test stations, to the display screen and to the remote control receivers.

9 Claims, 8 Drawing Sheets

DATA ACQUISITION AND PROCESSING EQUIPMENT FOR TESTING AUTOMOTIVE VEHICLES

BACKGROUND OF THE INVENTION

1. Field of the Invention

The present invention relates to data acquisition and processing equipment for testing automotive vehicles, for example in a test center, a repair shop, or at the exit of production lines.

2. Description of the Prior Art

As a general rule, technical test centers are equipped with a certain number of benches which are occupied successively by a tester and his vehicle in order to subject this vehicle to various tests, measurements, checks, inspections, and so on. Test benches may thus be provided for skidding, suspension, front and rear braking, steering lock, and so on.

In the most simple installations, a tester moves with his vehicle from one bench to another, depending on the type of test to be performed and collects, after each bench, the data relating to the test which has been made. In test stations of this type, all testing equipment units are independent.

Computerized installations nevertheless exist in which several test benches are connected to a data-processing system which centralizes the data. At the end of a test path, the system delivers the final test results.

While these installations constitute an improvement in automobile testing, they are nevertheless subject to a disadvantage arising from the fact that the test path can be occupied by only one tester at a time. Indeed, if two testers were to test two vehicles simultaneously on the same path (on different benches), the data-processing system would fail to distinguish the data received and would be incapable of attributing these data to either of the two vehicles.

Installations are also known in which testers have at their disposal an acquisition and storage box which is plugged into a connector provided on each bench for collecting and storing data relating to the test which they have just performed on said bench. At the end of operations, the tester connects his box to a data-processing system and empties the entire contents of the box into the system. This latter can then carry out the processing operation and deliver the results of the tests performed.

However, this system is again subject to disadvantages arising from the fact that the data-processing system is not connected directly to the various test benches. It is therefore necessary to store the information relating to the various tests, thus entailing the use of costly control boxes, then to transport, the information, which is a potential source of errors. Furthermore, since the benches are not connected either to the data-processing system or to each other, it is not possible to choose beforehand certain types of tests for certain vehicles on certain benches and other types of tests for other vehicles on the same benches. Neither is it possible to guide the tester from one bench to another as a function of the tests to be performed and of the availability of the different benches of the installation.

Finally, transmission of certain results of a measurement from one bench to another is impossible. For example, the weight of the vehicle measured on the suspension bench cannot be transmitted to the braking bench, with the result that it is not possible to calculate the braking efficiency which is equal to the ratio of the maximum braking force developed on the four wheels of the vehicle to the weight of the vehicle.

The present invention is directed to equipment which overcomes these disadvantages and improves technical testing of automobiles. The invention in fact makes it possible to work with large-capacity installations having a plurality of test paths each constituted by a plurality of test benches, a number of testers being permitted to operate simultaneously on a number of benches of the same path or on different paths.

The invention achieves this result by making use of means which serve to identify the vehicle from which the data delivered by each test bench originate. In other words, when a vehicle is present on a test bench, the data delivered by the bench are addressed to a central data-processing unit and are accompanied by an identity datum which makes it possible to associate the data with the vehicle. Thus the central unit is capable of managing all the items of information which are addressed thereto irrespective of the number of vehicles under test.

These identification means are essentially constituted by a remote control box assigned to each vehicle, the function of the box being to remotely control the test operations while at the same time supplying an identity to the system.

SUMMARY OF THE INVENTION

In more precise terms, the invention relates to data acquisition and processing equipment for a technical test center for automotive vehicles, the equipment being intended to permit simultaneous testing of a plurality of vehicles located at different test stations; this equipment is distinguished by the fact that it comprises:

remote control boxes each provided with a keyboard and an adjustable means for defining an identity for each control box, each box being capable of emitting a signal comprising a first portion which represents the identity of the control box and a second portion containing an item of information which can be a code corresponding to one key of the keyboard, a control and display console enabling an operator to assign a remote control box to each vehicle which arrives at the test center and to establish a correspondence between the identity of the vehicle and the identity of the control box which is assigned thereto, display means placed in proximity to the test stations, the display means being capable of displaying data relating to the test as well as a menu of operations proposed to the tester, each operation being presented on the screen with a selection code which corresponds to the codes of the different keys of the keyboard of the control boxes, remote control receivers placed in proximity to the display means, the receivers being capable of receiving the signal emitted by the control boxes, a computerized central unit connected to the display console, to the different test stations, to the display means and to the remote control receivers.

Preferably, the unit is provided with at least one acquisition card comprising a microprocessor connected to a plurality of subassemblies each constituted by an acquisition circuit connected to one of the test stations, a display control circuit connected to the display means associated with the station, the card being intended to receive the signals delivered by the different test stations to which it is connected, each signal being associated with the identification signal corresponding to the remote control box which has ordered the test operation, each signal being thus associated with a particular vehicle.

Preferably, the remote control box operates by means of infrared radiation. It will clearly be apparent, however, that other remote control devices could be employed (involving the use of ultrasound, radio waves, and so on).

Preferably again, the display means are cathode-ray tubes controlled by video signals. However, it would be possible to employ other means such as liquid-crystal flat-panel screens.

DETAILED DESCRIPTION OF THE INVENTION

Figure 1:
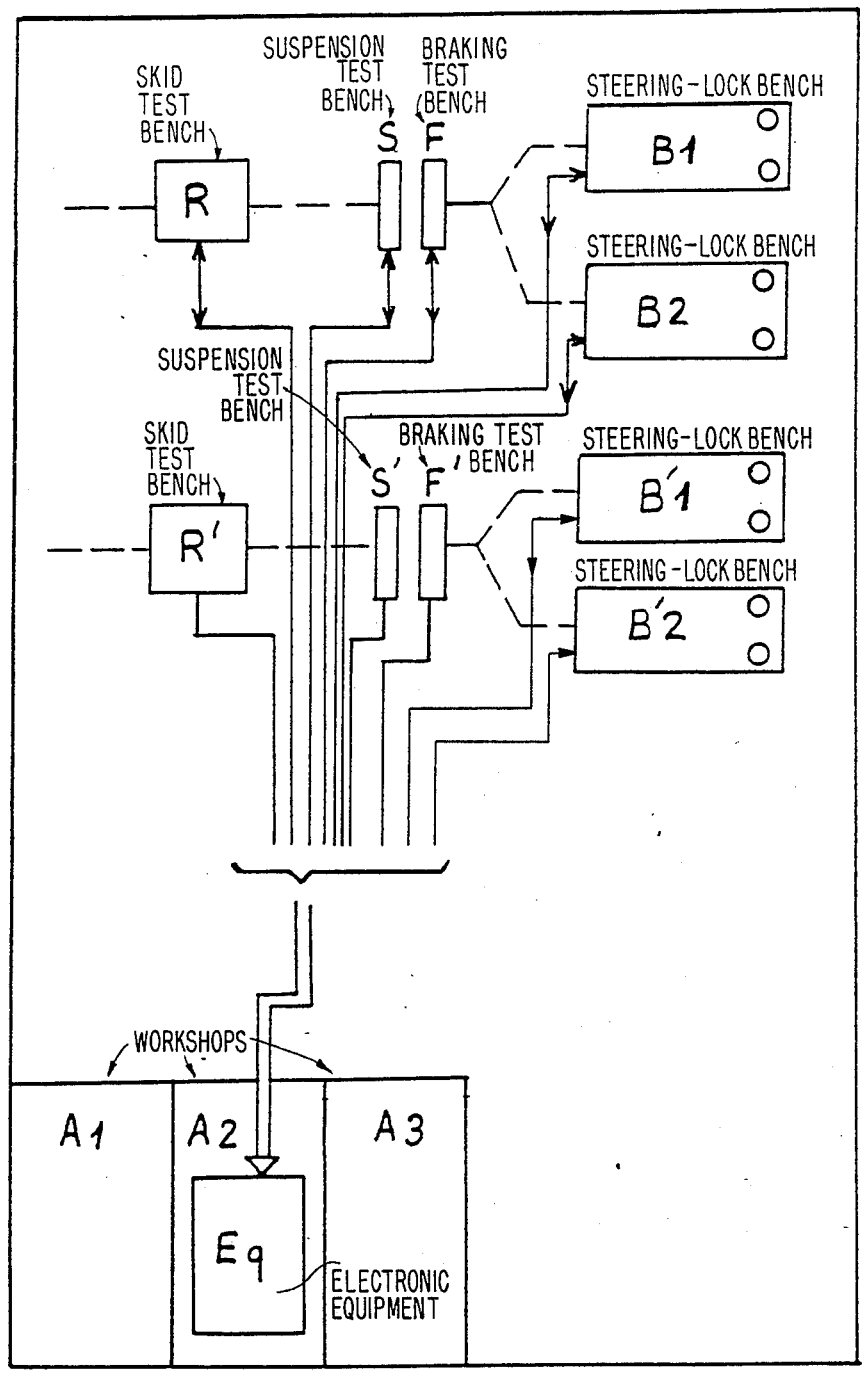
FIG. 1 is a general plan view of an installation for testing automotive vehicles, which can be controlled by the equipment in accordance with the invention.

FIG. 1 illustrates a technical automobile test center which can be controlled by the equipment in accordance with the invention. As represented in the figure, this center comprises a plurality of test paths consisting of several benches such as, for example, a skid test bench R, a suspension test bench S, a braking test bench F (front or rear), and steering-lock benches B1 and B2.

The test paths may be identical or different.

The center is also composed of a certain number of workshops A1, A2, A3 to be used, for example, for receiving customers, for secretarial services, or for testers who have the responsability of checking vehicles.

A portion Eq of the electronic equipment which serves to control and to manage this test center can be disposed, for example, within the workshop A2. This portion is connected to all of the test benches of the center.

Figure 2:
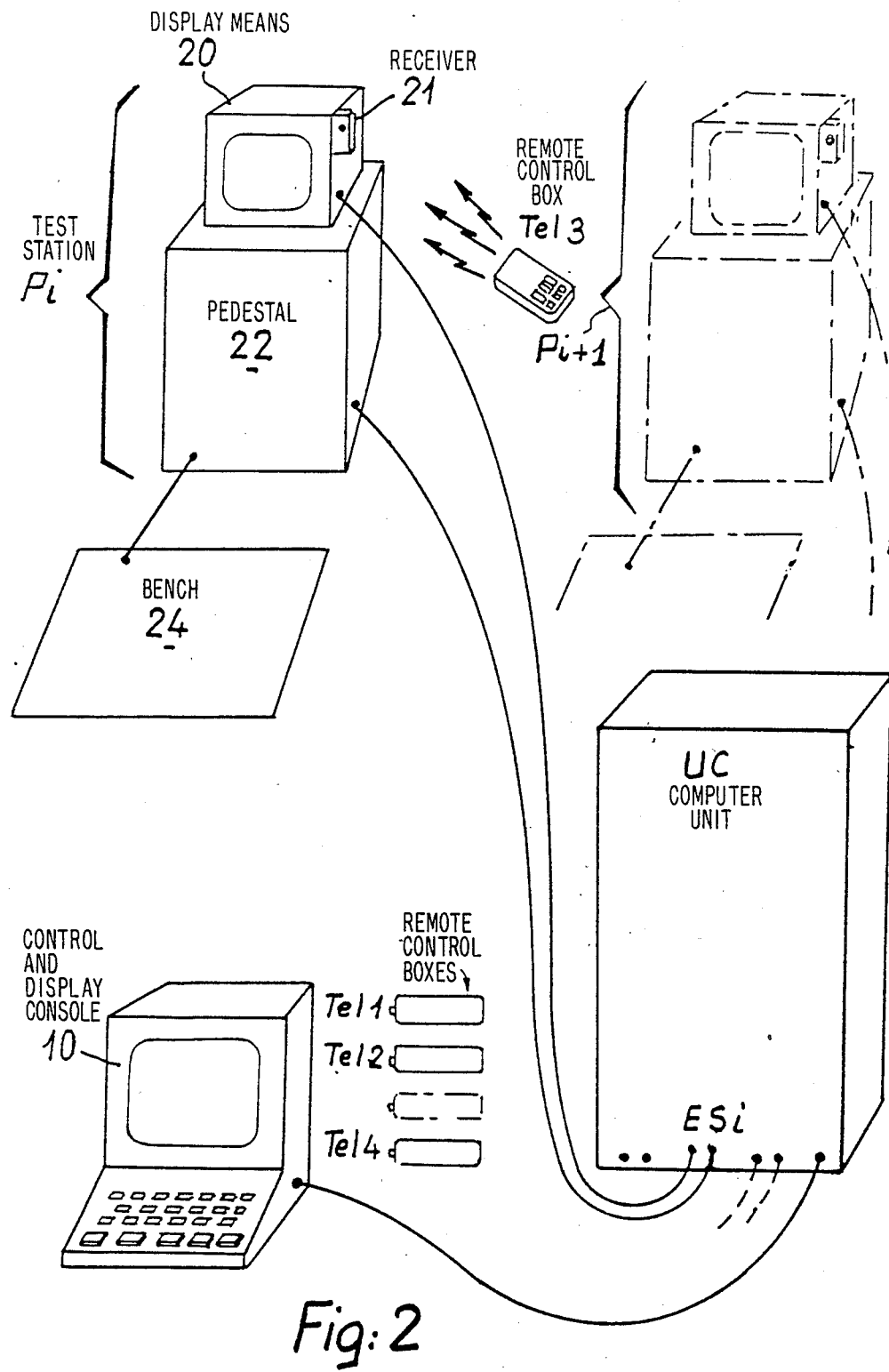
FIG. 2 is a general diagram of an equipment unit in accordance with the invention.

The present invention does not apply to the test benches which can be of any known type but to an equipment unit comprising a plurality of subassemblies represented schematically in FIG. 2. In this figure, there is shown a set of remote control boxes Tel 1, Tel 2, etc. As will be more readily understood hereinafter, these control boxes are each provided with a keyboard and an adjustable means for defining an identity. Each control box is capable of emitting a signal having a first portion which represents the identity of the control box and a second portion containing an item of information which can be a code corresponding to a key selected on the keyboard by the tester who is provided with the control box (but this information may also correspond to a measurement as will be more readily apparent hereinafter).

The equipment further comprises a control and display console 10 which enables an operator to assign a remote control box to each vehicle as it arrives at the test center and to establish a correspondence between the identity of the vehicle and the identity of the control box which is assigned thereto. It is apparent from FIG. 2, for example, that the remote control box Tel 3 has been assigned to a vehicle (not shown) which is being tested in the center but that the control boxes Tel 1, Tel 2 and Tel 4; are available. Twelve control boxes or more may be employed.

The equipment shown further comprises display means 20 consisting for example of a cathode-ray tube of the type used for televison receivers. These display means are capable of displaying various data relating to the test performed on the bench 24 and a menu of operations proposed to the tester who is stationed at the bench. Each operation is presented on the display screen with a selection code which corresponds to the code of the different keys of the keyboard of the control boxes.

The display means are placed on a pedestal 22 comprising electronic or electromechanical means for controlling the motors of one or a number of test benches 24.

The display means further comprises a receiver 21 which is capabale of cooperating with the remote control boxes.

The set of means 20, 21, 22 will constitute a "test station" and will accordingly be designated by this term hereinafter.

The test center is made up of several stations of this type as shown in FIG. 2 (Pi, Pi+1 ... ).

A test station can be assigned to one or more benches.

The equipment further comprises a computerized central unit UC which is connected to the control console 10 and to each of the different test stations.

The general operation of this equipment is as follows:

When a vehicle arrives, in order to undergo a test, there is assigned to the vehicle a remote control box which is selected from the available control boxes. The console 10 serves to indicate to the central unit UC that the remote control box chosen will correspond to the vehicle in question, which can be identified by its make, its type, its license plate, the registration card of the vehicle owner, and so on.

When equipped with this control box, the tester will carry out a series of requisite tests by moving from station to station. As the tester arrives in front of each station, the display screen proposes a series of operations designated by a code. The tester depresses the particular key of the control box corresponding to the operation which he desires to obtain. This has the effect not only of initiating this operation but also of indicating to the central unit that this operation concerns a specific vehicle.

The central unit is therefore capable of acquiring and processing information delivered by the test station without losing the information relating to the identity of the vehicle concerned.

The tester thus moves from one station to another either in a sequence which has been established beforehand at the moment of acceptance of the vehicle or at will as a function of occupancy of the test center.

When the test is completed, the central unit is capable of delivering, especially in printout form, the overall results of tests performed. The control box is then released and again put at the disposal of subsequent users.

It is understood under these conditions that the equipment in accordance with the invention is capable of managing a multipath, multitester and multivehicle test center. Moreover, there does not exist any prescribed layout for the different test paths. For example, an equipment unit in accordance with the invention is capable of accepting a dozen tester-vehicle pairs at the same moment at a number of different work stations. Neither is there any obligation to conform to an order in individual testing operations.

The central unit is capable of centralizing the results of measurements carried out at each station (suspension, braking, skidding, geometry, and so on) and of comparing them with data supplied by the manufacturer. The central unit is also capable either of printing the results on a report or of transmitting them to a management computer of the test center for edition and/or storage in memory.

Moreover, the equipment in accordance with the invention makes testing a very simple and very flexible operation by virtue of the permanent dialog established between the display screens and the tester. Furthermore, the tester does not need to leave his vehicle while measurements are being made at each station.

Figure 3:
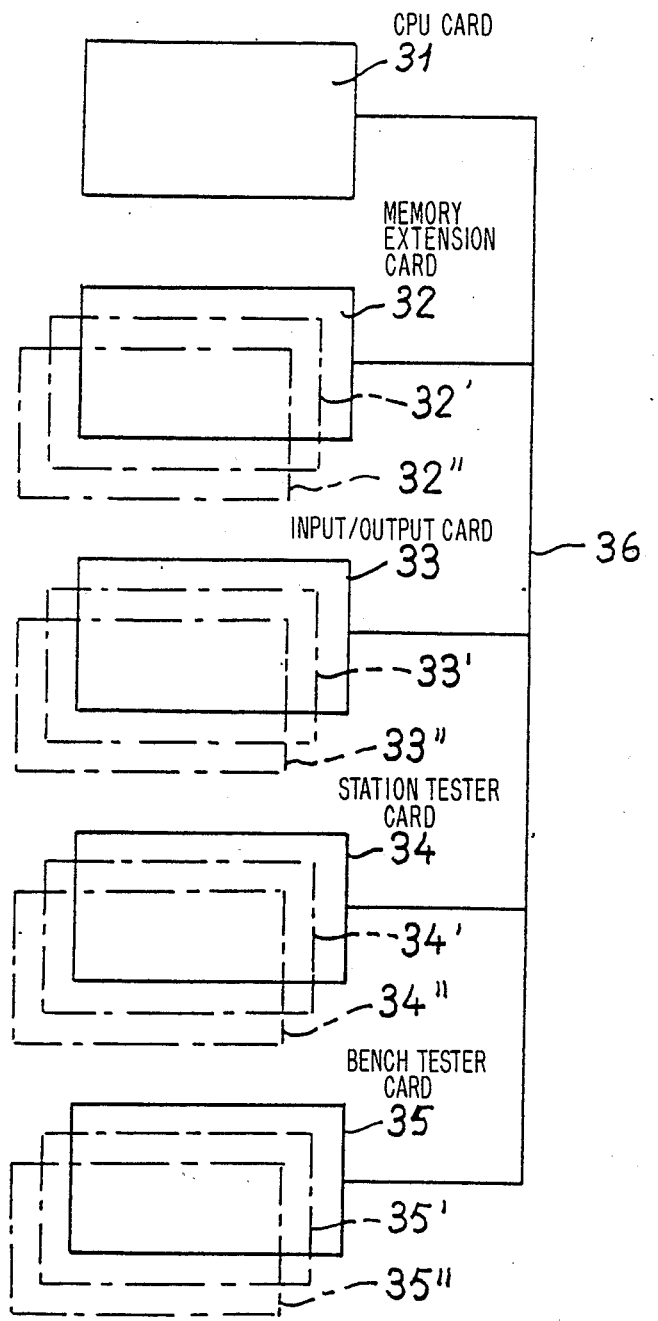
FIG. 3 shows the architecture of the central unit.

The central unit UC has an architecture which is illustrated schematically in FIG. 3.

The central unit comprises a card 31 known as a CPU card (for Central Processing Unit), memory extension cards 32, 32', 32'' . . . , input-output cards 33, 33', 33'' . . . cards, station tester cards 34, 34', 34'' . . . , bench-tester cards 35, 35', 35''. . . . All these cards are connected to the CPU card by a bidirectional bus 36.

The CPU card (designated by the reference 31) arbitrates the operation of the other cards and executes the program contained in the memory extension cards 32, 32', 32'', and so on. The CPU card also stores the results of measurement of the different vehicles under test.

The input/output cards 33, 33', 33'', etc. . . . make it possible to communicate with different types of peripherals: printers, keyboards, microcomputers, modems, and so on.

The station-tester cards 34, 34', 34'', etc. . . emit video signals in the direction of the different screens 20 and receive and decode the signals received on the infrared receivers 21.

The bench-tester cards 35, 35', 35'', etc. . . . receive the sensor signals derived from the benches, convert the analog signals to digital signals and transmit to the pedestals 22 the orders for starting, stopping and direction of the motor.

Figure 4:
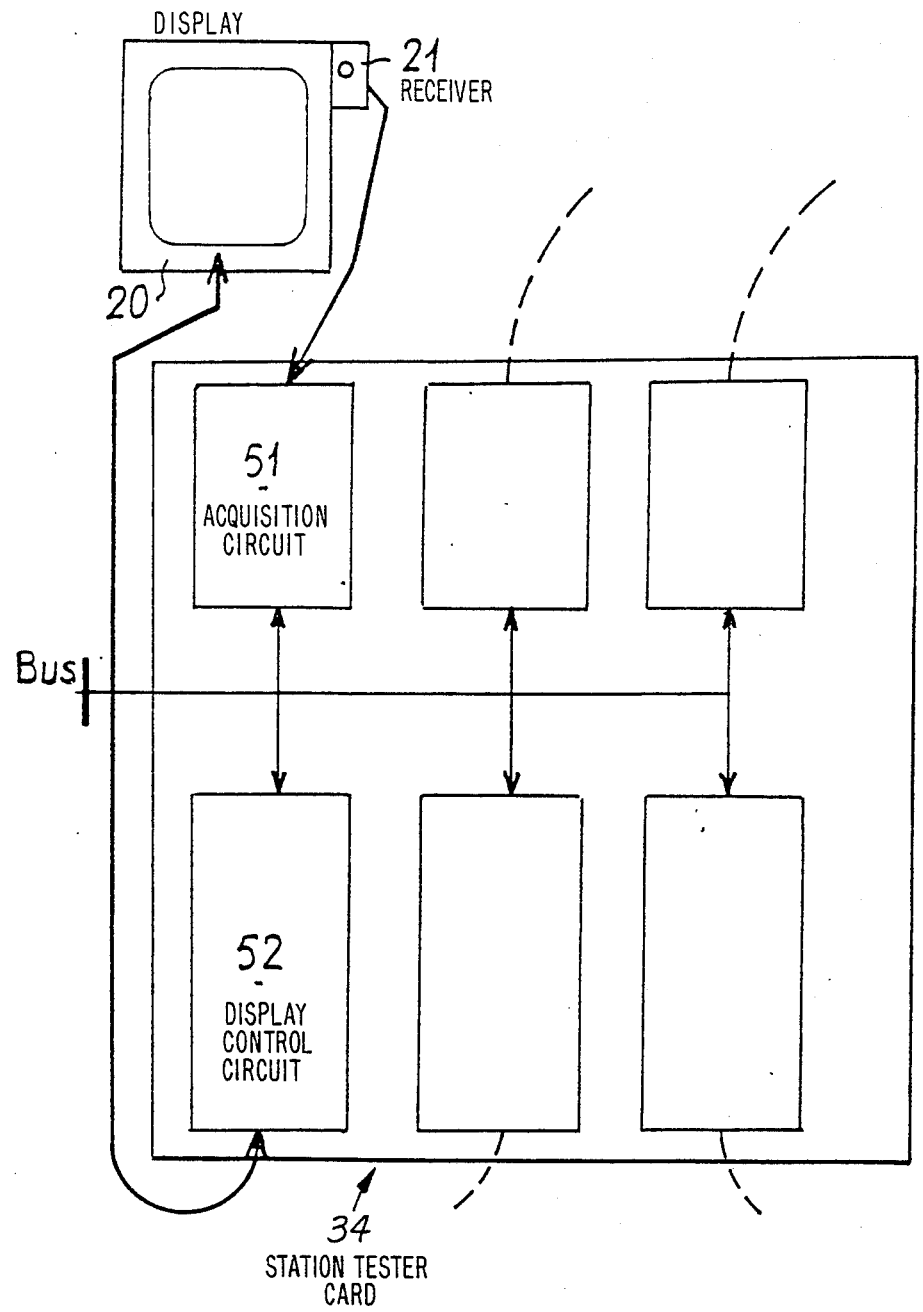
FIG. 4 shows the architecture of a station-tester card.

A station-test card is shown diagrammatically in FIG. 4. This card comprises subassemblies each made up of acquisition circuit 51 connected to a receiver 21 and a circuit 52 connected to the display means 20. The card shown in FIG. 4 comprises three subassemblies of this type which make it possible to correspond with three different test stations.

The function of the circuit 51 is to process the remote control data detected by the receiver 21. These data contain on the one hand the identity of the vehicle under test and on the other hand the order emitted by the tester by means of his control box. The function of the display control circuit 52 is to control display of data which appear on the screen of the display means 20.

The microprocessor circuit 51 decodes the infrared signals, checks whether the identity of the vehicle is in accordance with expectations, rejects unexpected data, memorizes the mode of operation (remote control or remote measurement) and the remote control or remote measurement information, then transmits this recording to the CPU card.

The CPU card transmits the identity of one or more expected vehicles to the circuit 51.

The circuit 52 contains the screen memory which is loaded by the CPU card and produces the video and synchronization signals from the memory onto the screen.

There will now be described in detail an alternative embodiment of the remote control system which makes it possible to transmit to the central unit on the one hand the identity information of the vehicle and on the other hand the information relating to the test operation to be performed.

Figure 5:
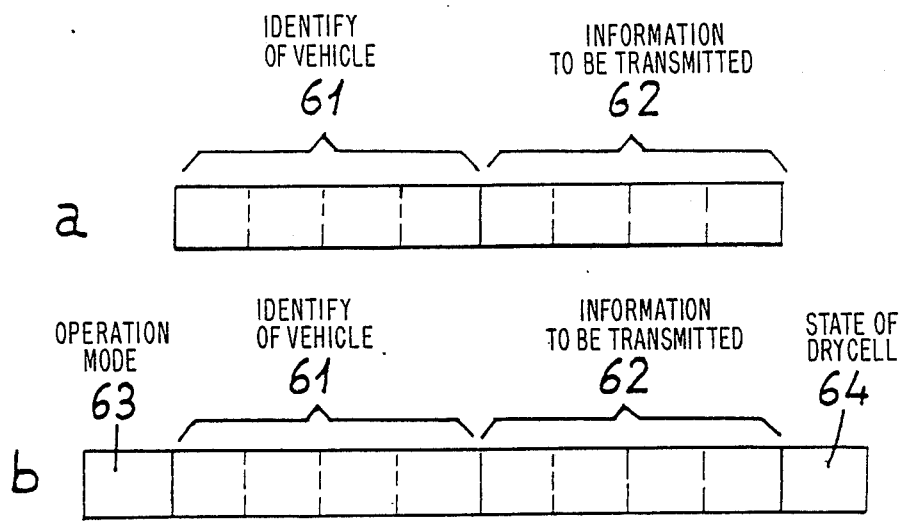
FIG. 5 shows the organization of the digital signals emitted by the remote control box.

The data transmitted by the remote control boxes are digital data which can be organized as illustrated in FIG. 5.

In portion (a) of this figure, it is apparent that the digital data transmitted are organized in two groups: a first group 61 which consists of four bits and which correspond to the identity of the vehicle and a second group 62 which is also composed of four bits and contains the information to be transmitted. In this form of construction, it will therefore be possible to make use of sixteen control boxes having different identities ranging from 0 to 15. It will also be possible to transmit data selected from a group comprising sixteen possible values. Naturally, should it be desired to employ more than sixteen control boxes, the number of available bits can be increased.

In portion (b) of FIG. 5, there is shown a packet of data which is slightly more complex than the preceding insofar as it contains in addition a first bit 63, the significance of which will become more apparent hereinafter and which serves to indicate to the test station that the operation is being performed either in the normal remote control mode or in the remote measurement mode.

The packet of data shown in portion (b) further comprises a last bit 64 which makes it possible to follow the state of the dry cell which is present within the remote-control box.

Figure 6:
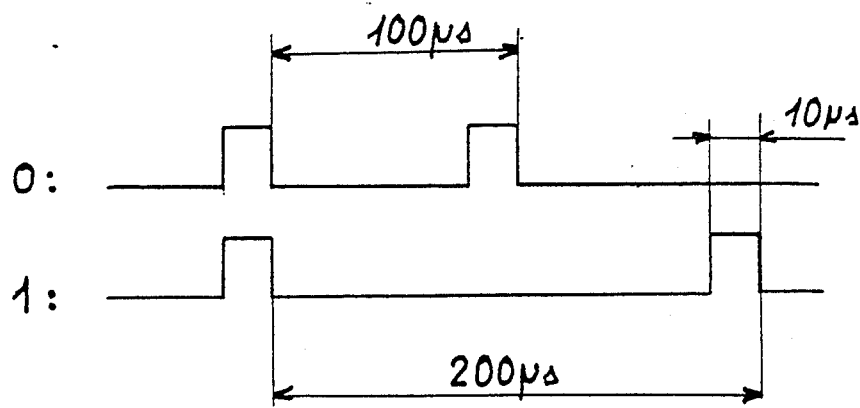
FIG. 6 illustrates a position modulation system.

In order to transmit all these digital data, preference is given to the use of a pulse-position modulation (PPM) system which is illustrated in FIG. 6. In order to transmit a bit having a value of 0, two pulses are emitted and separated by a time interval of the order of 100 $\mu$s. In order to transmit a bit having a value of 1, one again transmits two pulses but with a double interval and therefore 200 $\mu$s in the example considered. It is apparent that these values may be modified.

The time-duration of the pulses can be of the order of 10 $\mu$s, for example.

Figure 7:
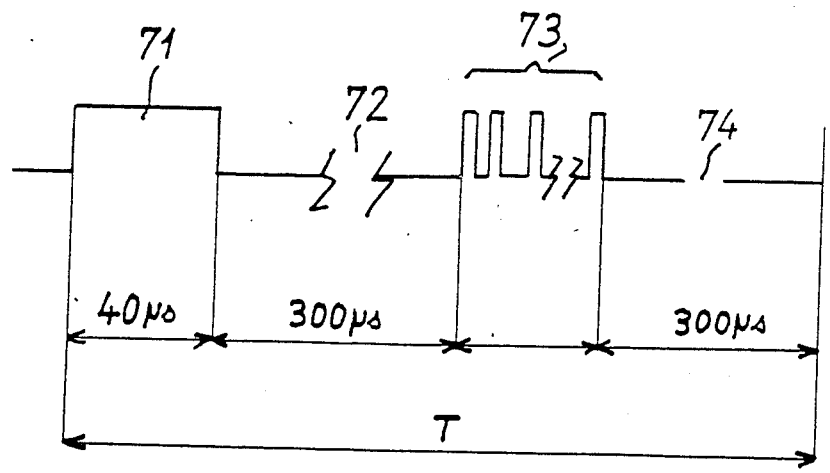
FIG. 7 shows the organization of a digital frame.

There is then constituted a digital frame which can be organized as illustrated in FIG. 7. The frame begins with a pulse 71 having a time-duration of approximately 40 $\mu$s, continues with a free interval having a duration of the order of 300 $\mu$s, then with an interval 73 during which binary data are emitted in accordance with the code represented in FIG. 6, and finally terminates in a free interval 74 which can also have a duration of 300 μs.

The first pulse 71 enables a microprocessor placed within the remote-control box to check the current which flows within the photodiode. Depending on whether the value obtained is above or below a predetermined threshold value, the microprocessor delivers a check bit having a value of 1 or 0, which is the bit 63 illustrated in FIG. 5b.

Figure 8:
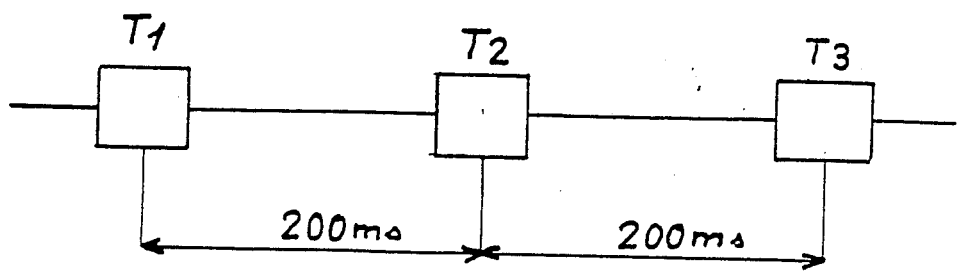
FIG. 8 illustrates the repetition cycle of a frame.

Each remote-control box re-emits a frame cyclically as illustrated in FIG. 8. By way of explanation, this figure shows three identical frames T1, T2, T3 separated by a time interval of 200 ms.

Figure 9:
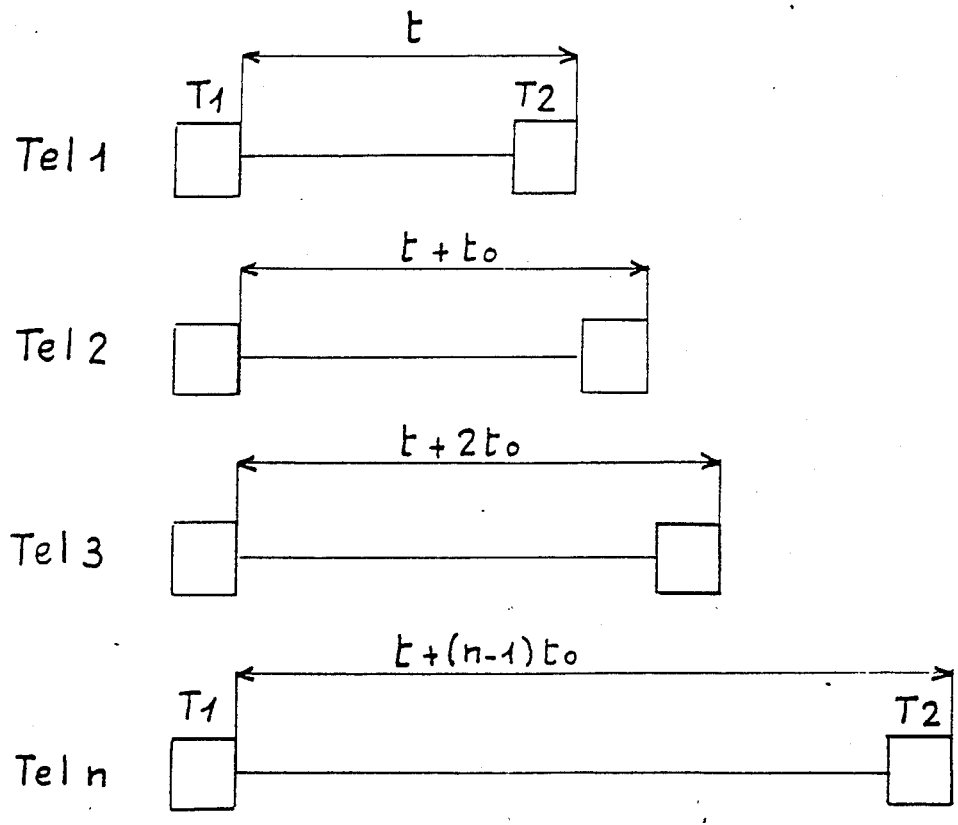
FIG. 9 illustrates an alternative embodiment in which the repetition cycle of a frame is dependent on the remote control box which emits this latter.

Since a number of operators may be present at the same time in a test center in order to carry out tests (which is precisely one of the possibilities offered by the system in accordance with the invention), one receiver may possibly receive a number of remote-control signals derived from a number of separate control boxes (certain signals reach the receiver after parasitic reflections). In order to reduce the risk of collisions of this type, the invention proposes by way of an alternative to employ a particular frame repetition cycle which is illustrated in FIG. 9.

A remote-control box having rank number 1 has a frame repetition cycle characterized by a period t equal to 200 ms, for example, as in the case of the example illustrated in FIG. 8. A remote-control box of rank 2 will have a frame repetition cycle characterized by a slightly higher value equal to t+tO. A remote-control box of rank n will then have a repetition cycle time-duration t+(n−1)tO.

Thus, with a frame repetition system of this type, if a collision appears in the case of two frames derived from two different remote-control boxes, this collision will necessarily be avoided in the case of the following frames since these latter will not be in coincidence. In remote-control reception, the information is validated after two identical consecutive frames.

Figure 10:
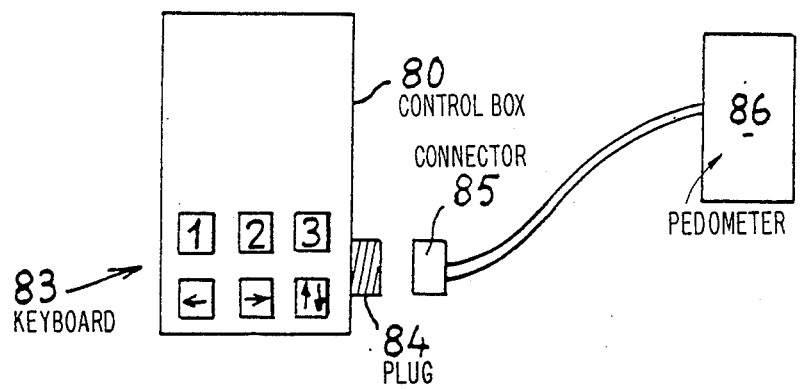
FIG. 10 shows an alternative embodiment of the control box with a possibility of connection with an additional device.

Although the chief function of the remote-control boxes is remote control of an order for performing a test operation, they may advantageously be employed as means for transmitting data derived from an ancillary device (remote measurement mode). This is the case illustrated in FIG. 10 in which is shown a control box 80 with its keyboard 83 as well as a plug component 84 in which is engaged a connector 85 connected to a device 86. This device can be a pedometer, for example.

Under these conditions, the pedometer installed on a vehicle delivers data which are directed through the control box 80 to the photoreceiver of the display means.

It is precisely the function of the bit 63 of FIG. 5b to define the mode of operation in progress. In the remote-control mode (bit 63 equal to 1, for example), the data 62 translate the code of the selected key; in the remote measurement mode (bit 63 equal to 0), the data 62 translate the information transmitted by the pedometer. It is possible to change-over from one operating mode to the other simply by producing action on the keyboard. For example, the remote measurement mode will be obtained by depressing two keys simultaneously and the remote control mode will be obtained by depressing only one key.

Figure 11:
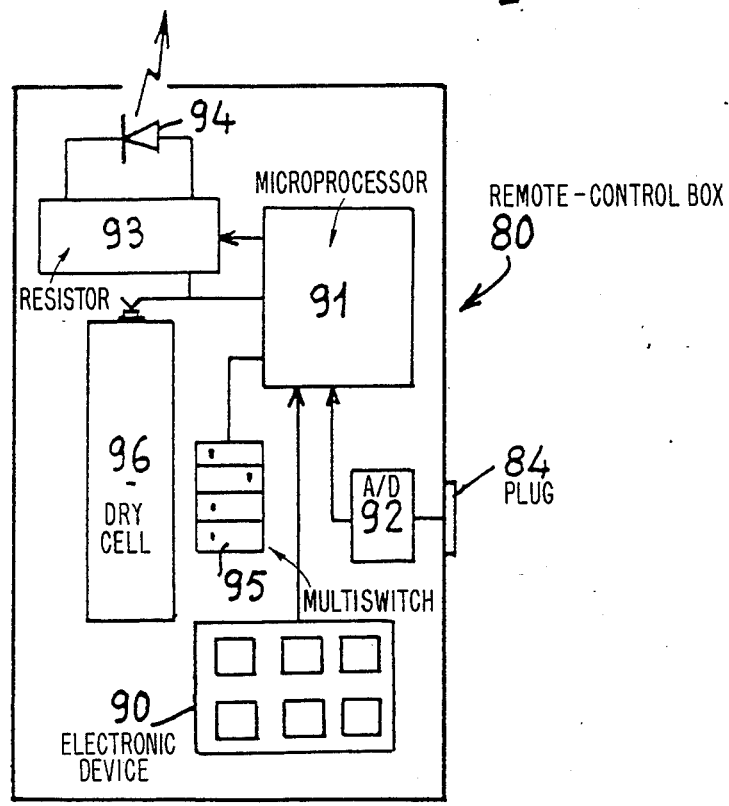
FIG. 11 is the electrical diagram of a remote control box.

FIG. 11 shows the general arrangement of a remote-control box 80 in the event that the box operates by emission of infrared radiation. The control box shown has a circuit 90 which translates the pressure exerted on a key to an electric signal addressed to a microprocessor 91. The input of an analog-to-digital converter 92 is connected to the connector 84 and its output is connected to the microprocessor 91. This latter controls a circuit 93 for supplying an electroluminescent diode 94. A device 95 of the multiswitch type serves to display a digital identity, for example on four bits if it is desired to obtain sixteen distinct identities. A dry cell 96 supplies the complete assembly. The circuit 93 contains a resistor connected in parallel with the diode and the microprocessor measures the current which flows through the resistor. It, then delivers a control bit which indicates whether the current is above or below a threshold value. This is the bit designated by the reference 64 in FIG. 5b.

The keyboard 83 and its associated electronic device 90 do not need to be of great complexity by reason of the dialog established between the tester and the test station.

It is usually only necessary to provide three keys marked 1, 2 and 3 in order to designate a choice among three offers and a few keys of the "forward" and "reverse" type.

As has already been mentioned, the equipment in accordance with the invention is intended to equip not only technical test centers for automotive vehicles but also repair shops or vehicle production lines at the exit of these production lines.

What is claimed is:

1. Data acquisition and processing equipment for simultaneous testing of a plurality of vehicles located at different test stations in a technical test center, a repair shop, or at an exit of a vehicle production line, comprising
   (a) remote control boxes each provided with a keyboard and an adjustable means for defining an identity for each control box, each box being capable of emitting a signal comprising a first portion which represents the identity of the control box and a second portion containing an item of information which can be a code corresponding to one key of the keyboard,
   (b) a control and display console enabling an operator to assign a remote control box to each vehicle which arrives at the technical test center and to establish a correspondence between the vehicle and the control box which is assigned thereto,
   (c) display means placed in proximity to each of the test stations, said display means being capable of displaying data relating to the test as well as a menu of operations proposed to the operator, each operation being presented on a screen with a selection code which corresponds to the codes of the different keys of the keyboard of the control boxes,
   (d) remote control receivers placed in proximity to the display means, said receivers being capable of receiving the signal emitted by the control boxes, and
   (e) a computerized central unit connected to the display console, to the different test stations, to the display means and to the remote control receivers.

2. Equipment according to claim 1, wherein the computerized central unit is provided with at least one station test card comprising a plurality of subassemblies each constituted by an acquisition circuit connected to one of the test stations and, a display control circuit connected to the display means associated with said station.

3. Equipment according to claim 1, wherein the remote control boxes are of an infrared emission type and comprise at least one diode which emits radiation in the infrared region.

4. Equipment according to claim 3, wherein the identity of each control box and the remote control data are transmitted digitally by coded pulses.

5. Equipment according to claim 4, wherein the coded pulses are position-coded.

6. Equipment according to claim 4, wherein the digital data transmitted are organized in frames which are repeated cyclically.

7. Equipment according to claim 6, wherein the period of repetition of the frame transmission cycle varies from one control box to another.

8. Equipment according to claim 3, wherein each remote control box comprises a connector for establishing an electrical connection with a device and, an analog-to-digital converter for converting the quantity delivered by the device and converting it to digital form for transmission by the control box instead of the remote control data.

9. Equipment according to claim 1, wherein the display means are cathode-ray tubes.

* * * * *